United States Patent [19]
Kaiser

[11] 3,790,235
[45] Feb. 5, 1974

[54] CENTRALLY FREE GIANT BEARING

[75] Inventor: Theodor Kaiser, Hagen-Kabel, Germany

[73] Assignee: Hoesch Werke Aktiengesellschaft, Dortmund, Germany

[22] Filed: Dec. 18, 1972

[21] Appl. No.: 316,139

[30] Foreign Application Priority Data
Dec. 20, 1971   Germany...................... 2163199

[52] U.S. Cl.................................. 308/10, 74/5.6
[51] Int. Cl. ........................................... F16c 39/06
[58] Field of Search.......................... 308/10; 74/5.6

[56] References Cited
UNITED STATES PATENTS
| | | | |
|---|---|---|---|
| 3,508,444 | 4/1970 | Sitomer | 308/10 |
| 3,512,851 | 5/1970 | Love | 308/10 |
| 3,490,816 | 1/1970 | Lyman | 308/10 |
| 3,565,495 | 2/1971 | Lyman | 308/10 |
| 2,514,116 | 7/1950 | Baker | 308/10 |

*Primary Examiner*—R. Skudy
*Attorney, Agent, or Firm*—Walter Becker

[57] ABSTRACT

A centrally free giant bearing for absorbing axial and radial loads as well as loads caused by moments, in which a protrusion of a nose ring is embraced on three sides by a two-sectional supporting ring which at its bearing surfaces is provided with circumferentially distributed controllable electromagnets, whereas the nose ring is provided with circumferentially distributed non-variable electromagnets.

2 Claims, 1 Drawing Figure

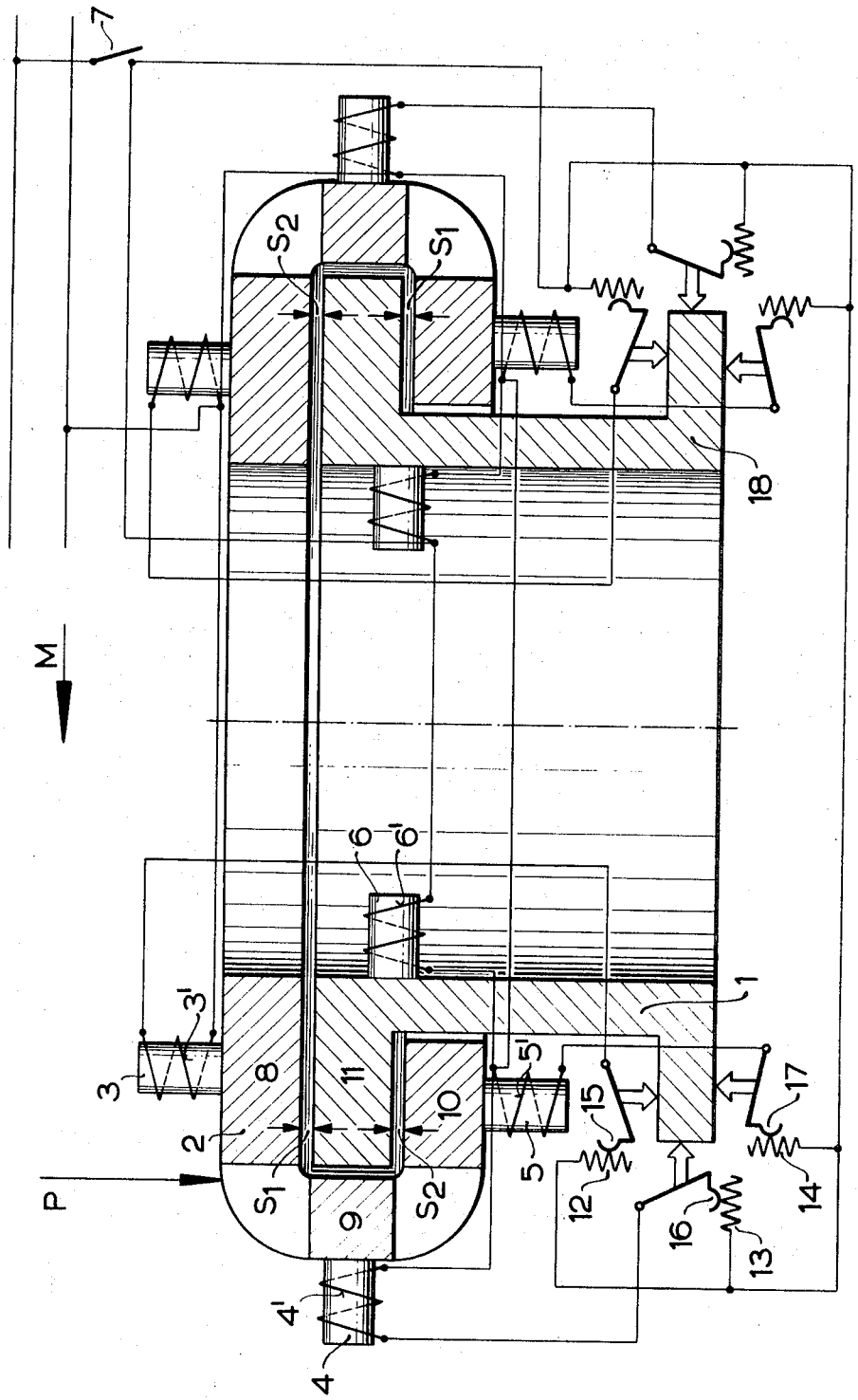

CENTRALLY FREE GIANT BEARING

The present invention relates to a centrally free giant bearing for receiving axial, radial and moment loads, while a protrusion of a nose ring is surrounded on three sides by a two-sectional supporting ring.

Giant bearings of this type serve for journalling, for instance, radar antennas which have a great weight and low speed of revolution and which are subjected to alternating loads due to wind forces coming from different directions or icing. These loads act in axial as well as in radial direction and produce torques which have to be absorbed by the giant bearing.

The heretofore known giant antifriction bearings employed for this purpose, which must have a small play, have the drawback that under the above described load and wheather conditions they are subjected to an increased wear which necessitates a correspondingly expensive servicing.

Furthermore, at the low speed of the antifriction bodies their appears the so-called stick-slip effect, which means a slipping of the antifriction bodies in the region between static friction and rolling friction. This results in a jerking within the bearing whereby in case, for instance, of precision measuring instruments being journalled in the bearing, faulty measuring values will result.

Also magnetic bearings have become known, in which elements of lower weight, for instance, rotor shafts of electric meters and rotors with extremely high speeds are journalled. The rotor is by means of a supporting magnet producing a uniform magnetic field with a vertical component held in vertical direction in a stable position. When the rotor deviates from its vertical axis in radial direction, it is returned to its proper position by controlled electromagnets. Inasmuch as the girostatic effect contributes to a stabilization, the expenses for the control as well as the required power are relatively low.

By means of the heretofore known arrangement of electromagnets with variable field intensity, a compensation of only slight axial or radial loads is possible.

It is, therefore, an object of the present invention to provide a centrally free giant bearing which will be suited for the contact-free absorption of axial and radial loads and of moment loads, especially of loads which vary with regard to their direction and magnitude.

This object and other objects and advantages of the invention will appear more clearly from the following specification in connection with the accompanying drawing diagrammatically illustrating a cross section through a giant bearing according to the present invention.

The giant bearing according to the invention for absorbing axial and radial loads as well as moment loads, while a protrusion of a nose ring is surrounded on three sides by a two-sectional ring, is characterized primarily in that the supporting ring at its bearing surfaces is provided with circumferentially distributed adjustable electromagnets whereas the nose ring is provided with circumferentially distributed non-adjustable electromagnets.

For controlling the field intensity of the electromagnets of the nose ring, it is suggested according to a further development of the invention that each adjustable or controllable electromagnet has associated therewith a control system known per se which controls the exciting current in conformity with the respective stroke.

Referring now to the drawing in detail, the nose ring 1 forms the lower bearing ring, whereas the supporting ring 2 surrounding the nose ring 1 on three sides forms the upper bearing ring. On the two outer end surfaces and on the outer circumferential surface of the supporting ring 2 there is arranged a plurality of controllable electromagnets 3, 4, 5 which are substantially evenly distributed over the respective surfaces. The number of the electromagnets depends on the diameter of the giant bearing and should expediently on each surface amount to at least six. The respective same number of non-controllable electromagnets 6 is circumferentially distributed over the circumference of the stationary nose ring 1.

Each electromagnet is provided with an operating or energizing coil 3', 4', 5' and 6' respectively. The energizing coils of the electromagnets 3, 4, 5 and 6 are adapted by means of a switch 7 to be connected to a current source in such a way that the electromagnets 3, 4, 5 and 6 at the oppositely located bearing surfaces 8, 11; 9, 11; 10, 11 have poles of the same polarity and thus produce repelling forces. When the air gaps between the bearing rings 1, 2 are small, in other words when only a slight bearing play exists, it is possible with little electric power to produce high forces which are limited only by the saturation of the ferromagnetic material, for instance iron, in conformity with the magnetizing curve.

The supporting ring 2 is relative to the nose ring 1 held in floating condition by the forces which are effective between the bearing ring surfaces 8, 11 and 10, 11 without requiring further mechanical means for this purpose.

In conformity with the outer loads acting upon the bearing, in addition to the weight proper of the supporting ring 2 and of the structures mounted thereon, for instance, a radar antenna, the magnitude of the magnetic forces is adjusted by means of the adjustable electromagnets 3, 4, 5 by changing the intensity of the current flowing through the respective energizing coils.

In the embodiment illustrated in the drawing, the current control is effected by resistors 12, 13, 14 which are respectively associated with the electromagnets 3, 4, 5 and are through feelers or pick-offs 15, 16, 17 changed as to their resistance.

The variable resistors 12, 13, 14 are fixedly connected to the supporting ring 2 in any standard manner (not illustrated), and the feelers 15, 16, 17 engage surfaces of the ring 18.

When an outer force P generated by a moment M acts upon the supporting ring 2, there exists the tendency to narrow the gap $S_1$ which faces toward this force and to widen the lower gap $S_2$.

As will be evident from the drawing, the conditions prevailing at the oppositely located area of the giant bearing, i.e., at the area offset by 180° with regard to the area referred to in the preceding paragraph, are precisely reversed so that the lower gap the width of which is decreased has been designated as $S_1$ while the upper gap the width of which is increased has been designated as $S_2$.

In the first mentioned area, the bearing surface 8 approaches the bearing surface 11, the resistor 12 is displaced relative to the feeler 15 and lowers its resistance, and the current in the energizing coil associated with the electromagnet 3 and the repelling force between the bearing surfaces 8 and 11 increases. Simultaneously with the decrease in the resistance of the resistor 12, an increase in the resistance of the resistor 14 occurs so that the current decreases in the energizing coil which is associated with the electromagnet 5. The repelling force between the bearing ring surfaces 10, 11 decreases. At the oppositely located area of the giant bearing, i.e., the area which is offset by 180°, the electromagnets are correspondingly controlled in a precisely inversed manner. The electromagnets arranged in the sector ranges between the two described extreme areas are controlled by intermediate values.

A horizontal component of force acting in radial direction of the moment M is absorbed by the electromagnet 4 which is controlled by the resistor 13 in cooperation with the feeler 16 and is furthermore absorbed by the controllable electromagnets which are located in the same plane but are not shown.

It is, of course, possible without difficulties to rotatably arrange the ring 1 and to fixedly arrange the ring 2. Furthermore, it may be advantageous to produce the bearing rings 1 and 2 of two different ferromagnetic materials which, when used in combination, will have emergency running properties in case of a power failure.

It is, of course, to be understood that the present invention is, by no means, limited to the particular showing in the drawing but also comprises any modifications within the scope of the appended claims.

What I Claim Is:

1. A centrally free giant bearing for absorbing axial and radial loads as well as loads resulting from moments, which includes: a first annular member having a radially outwardly extending annular flange, a multi-sectional second annular member having two oppositely located end faces and a circumferential surface and surrounding said flange in slightly spaced relationship thereto and on three sides thereof, a set of variable electromagnets arranged on and distributed over said two end faces and said circumferential surface, control means operatively connected to said variable electromagnets for controlling the same, and a set of nonvariable electromagnets associated with said first annular member and circumferentially distributed thereon.

2. A bearing according to claim 1, in which said control means include variable resistors.

* * * * *